(12) United States Patent
Khoshaba

(10) Patent No.: US 8,152,506 B1
(45) Date of Patent: Apr. 10, 2012

(54) PRESSURE GENERATING DEVICE WITH FOOD COMPRESSING ATTACHMENT

(75) Inventor: Albert Khoshaba, Hanover Park, IL (US)

(73) Assignee: Atoor Khoshaba, Chicago, IL (US)

( * ) Notice: Subject to any disclaimer, the term of this patent is extended or adjusted under 35 U.S.C. 154(b) by 918 days.

(21) Appl. No.: 12/154,278

(22) Filed: May 21, 2008

(51) Int. Cl.
*A23P 1/12* (2006.01)

(52) U.S. Cl. .................. 425/113; 425/126.2; 425/192 R

(58) Field of Classification Search ............... 425/113, 425/126.2, 192 R; 426/513, 516
See application file for complete search history.

(56) References Cited

U.S. PATENT DOCUMENTS

| | | | | |
|---|---|---|---|---|
| 2,205,518 | A | * | 6/1940 | Duffy ............................ 425/113 |
| 2,371,709 | A | * | 3/1945 | Rineer .......................... 425/146 |
| 2,794,213 | A | * | 6/1957 | Davis ............................ 425/113 |
| 3,001,485 | A | * | 9/1961 | Czik ............................. 425/183 |
| 3,163,542 | A | * | 12/1964 | Clemens ....................... 426/245 |
| 3,758,247 | A | * | 9/1973 | Deegen ......................... 425/114 |
| 3,817,674 | A | * | 6/1974 | Paige ............................ 425/113 |
| 4,036,442 | A | | 7/1977 | Barnes |
| 4,112,545 | A | | 9/1978 | Covington et al. |
| 4,148,598 | A | | 4/1979 | Colosimo et al. |
| 4,383,813 | A | | 5/1983 | Podell et al. |
| 4,456,450 | A | | 6/1984 | Heling |
| 4,893,553 | A | | 1/1990 | Emsens |
| 5,109,757 | A | | 5/1992 | Dolle |
| 5,161,447 | A | | 11/1992 | Emsens |
| 5,174,195 | A | | 12/1992 | Anderson |
| 5,252,050 | A | * | 10/1993 | Zimmer ........................ 425/113 |
| 5,259,746 | A | * | 11/1993 | Minuado ...................... 425/114 |
| 5,382,401 | A | * | 1/1995 | Pickett et al. ............. 264/177.16 |
| 5,773,043 | A | | 6/1998 | Hunter |
| 6,269,740 | B2 | | 8/2001 | Kojs |
| 6,277,018 | B1 | | 8/2001 | Cody et al. |
| 6,419,968 | B1 | | 7/2002 | Wang et al. |
| 6,450,851 | B1 | | 9/2002 | Rehkemper et al. |
| 6,474,224 | B1 | | 11/2002 | Natter |
| 6,789,468 | B2 | | 9/2004 | Rosen |
| 6,989,170 | B2 | | 1/2006 | Konanayakam et al. |
| 7,144,316 | B1 | | 12/2006 | Chen |
| D543,802 | S | | 6/2007 | Fuchs |
| RE39,943 | E | | 12/2007 | Kobussen et al. |
| 2006/0034959 | A1 | | 2/2006 | Lin |
| 2007/0182058 | A1 | | 8/2007 | Chen et al. |
| 2007/0245893 | A1 | * | 10/2007 | Chen .............................. 92/247 |

OTHER PUBLICATIONS

Kabobzan!; Kabobmaker, Jul. 22, 2008; http://www.kabobzan.com/; HZ Systems, Inc,, a subsidiary of NARI Products, Inc.; USA 972-991-1918 (phone);972-991-1235(fax); USA: 12900 Preston Road,Suite 804, Dallas, TX 75230; E-mail: sales@kabobzan.com.
Batchmaster; Batchmaster's New Equipment Inventory; http://www.bmaster.com/inventory_new.html; P.O. Box 1303 Fayetteville,Arizona; Jul. 22, 2008.

* cited by examiner

*Primary Examiner* — Robert B Davis
(74) *Attorney, Agent, or Firm* — Adrienne B. Naumann

(57) ABSTRACT

Described herein is a removable food compressing attachment in combination with a pressure generating device. The food compressing attachment connects to an aperture within the pressure generating device, so the aperture is continuous with the food compressing attachment interior. When a longitudinal cooking tool inserts into the food compressing attachment interior, food flowing from the aperture enters the attachment interior under pressure from the pressure generating device. The compressed food within the attachment interior forms a fixed continuous shaped mass along the longitudinal cooking tool which traverses the attachment interior. There is also a removable template by which the food compressing attachment can produce a narrower continuous food mass along the longitudinal cooking tool.

4 Claims, 6 Drawing Sheets

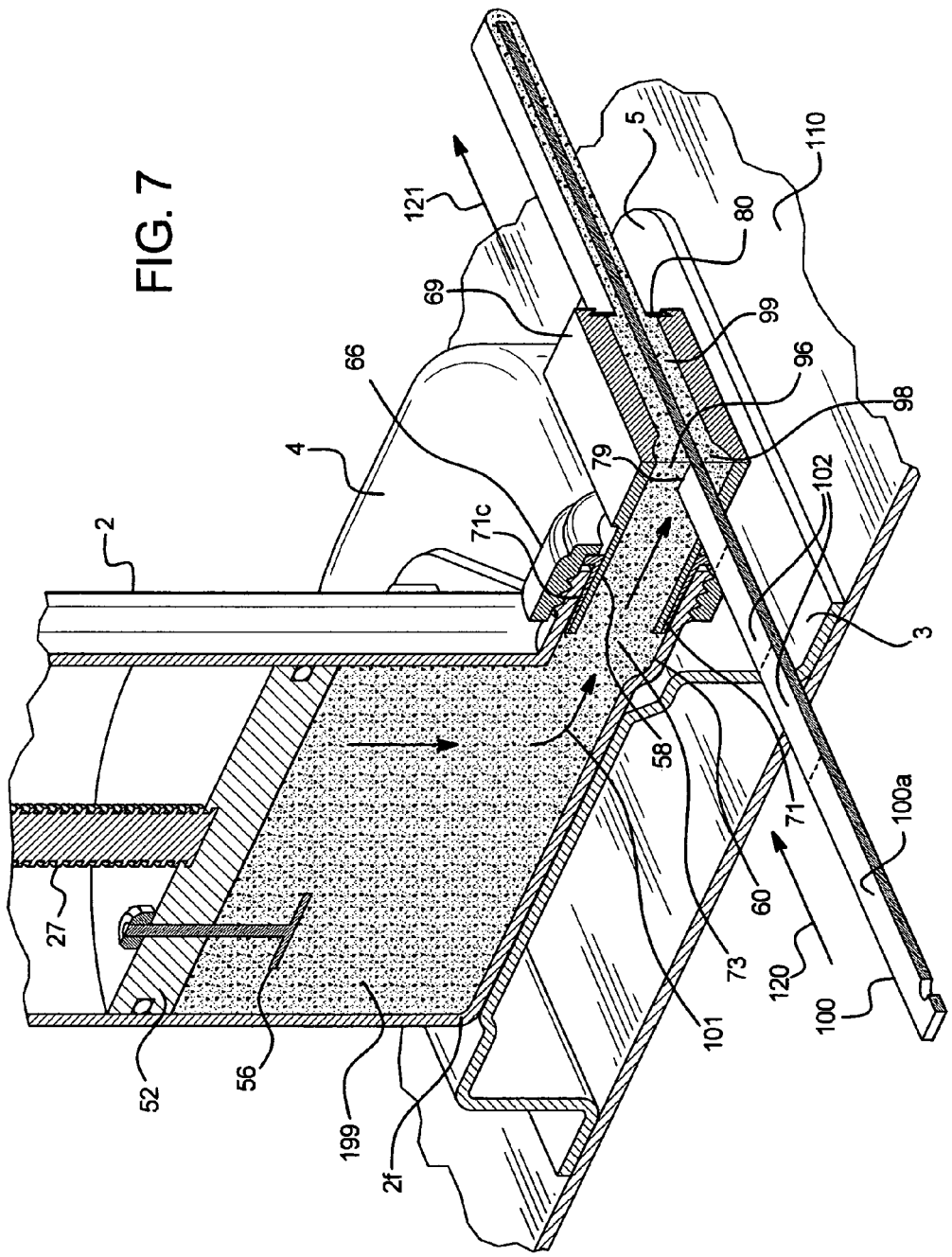

PRESSURE GENERATING DEVICE WITH FOOD COMPRESSING ATTACHMENT

BACKGROUND OF THE INVENTION

This invention relates generally to a pressure generating device combined with a food compressing attachment. More specifically, this invention relates to a manually operated tabletop pressure generating device which reversibly connects to a food compressing attachment. A user can insert a longitudinal cooking tool such a kabob skewer through the compressing attachment and move it continuous through the attachment interior. This removable attachment interior is shaped to compress semi-solid food continuously along the longitudinal axis of a skewer. A circular disk compresses the food in the container which is then extruded into the food compressing attachment and onto the skewer.

Previous devices include disclosed devices which slice or extrude food products for alignment along a skewer or other tool, often for production of meat, vegetable and fruit kabobs. For example U.S. Pat. No. 4,893,553 (Emsens) discloses a device which automates the production of meat or vegetable kebabs threaded on skewers. The assembly contains numerous tubes which correspond to apertures within a common lid. The tubes fit into corresponding apertures, thereby providing a guiding and positioning assembly for the skewer within each tube. However, Emsens' device lacks the simplicity and ability to retrofit previous pressure generating devices which the present invention comprises.

U.S. Pat. No. 5,109,757 (Dolle) discloses an apparatus with numerous bores and slide mounts within the main body for the apparatus. The slide's apertures are oriented either coaxially, or offset, within the bores to allow corresponding skewers to move relative to these bores. The immobilization of each skewer in a corresponding bore results from a bearing of the slide in the respective bore. The effectiveness of the invention depends in part upon the material possessing either elastically compressible or possessing a high coefficient of friction. The present invention does not require these materials properties, and Dolle cannot be retrofit existing pressure generating devices in the food industry.

U.S. Pat. No. 5,161,447 (Emsens) discloses an assembly which slices foods for shish kabobs. The assembly includes blades which align with slits within a container which contains layers of food materials. The assembly moves to and from a physically separate container so that the blades fit and move forward into, through, and finally away from the food layers through the container slits. U.S. Pat. No. 5,174,195 (Anderson) discloses a device for impaling food segments with skewers. The device includes a base divided into numerous compartments for placing individual food segments. There are guide openings within both end walls and which align with apertures in partition walls, for guiding the skewer through the approximate center of food segments. The present invention is safer that those of Emsens and Anderson, and these devices lack the design to retrofit pressure existing generating devices U.S. Pat. Application Pub. No. US 2007/0245893 A1 (Chen) discloses an extruder as part of a food container. A piston rod with an attached dish slides into the container, and the lower segment of the dish has an inclined bottom edge. A sealing ring sits within a groove in the dish and presses against the inner container surface. Chen does not disclose a partially hollow component which attaches to the extruding opening and shapes food so no casing or other additional physical binding agent is necessary. U.S. Pat. No. 4,456,450 (Heling) discloses a manually operable extrusion press with a cylinder and piston rod. The piston rod has flexible prongs and a bottom nozzle with at least one aperture. A 90 degree rotation of the piston rod around its own axis causes pawls with flat rod surfaces to enable upward or downward piston movement. Heling does not disclose a partially hollow attachment through which a skewer is continuously and progressively enclosed by compressed food.

U.S. Pat. No. 4,148,598 (Colosimo et al.) discloses an extrusion die for sausage and other foods. The extrusion die has numerous open ended elongated passages and a v-shaped common inlet. Attachments to the press provide a further method of processing extruded food. U.S. Pat. No. 4,112,545 (Covington et al.) discloses a device for extruding ground food as a continuous column. The column is broken into chunks by wipers which sweep across the extrusion opening No. U.S. RE39, 943 E discloses an extrusion attachment for sausage machines. The attachment contains three concentric tubes under different pressures, and the attachment is threaded for connection to the extruding device. None of these extrusions means are designed to be retrofit to existing pressure generating devices or can be scaled for the end-use of a private home and consumer.

U.S. Pat. No. 7,144,316 B1 (Chen) discloses an auger device which attaches to a nozzle of a sausage producing machine. The auger extends from the extruder outlet, while a ring is mounted upon the outlet, as is a casing holder. Ground meat is pushed exteriorly by the elongated auger. U.S. Pat. No. 4,036,442 (Barnes) discloses an extruding method together with a device which cuts extruded meat into pieces. The extrusion plate has several apertures, is perpendicular to the axis of the extruding device, and is made from low friction material. Neither of these devices are designed to retrofit to existing pressure generating devices and the current invention does not require a casing or a device to sever meat exterior to the extruding component.

U.S. Pat. No. 5,773,043 (Hunter) discloses an extruder device for shaping food into discrete shapes. The extruder device contains a pressure vessel for holding mashed food, a manifold connecting with the pressure vessel, and at least one die and cutter assembly which is continuous with the manifold. The die and cutter assembly has an extrusion member with an open end which attaches to the manifold. The extrusion die has a shape which mimics the cross-sectional shape of the food with a substantially constant transverse food flow rate throughout the die.

U.S. Pat. Pub. No. US2006/0034959 A1 (Lin) discloses a food extruder with a pressing plate. The pressing plate connects to a supporting frame with an extrusion aperture. An extruding rod slides and extends into a holder by its first end. The pressure generating component moves an extruding rod relative to the entire device. U.S. Pat. No. 4,383,813 (Podell et al.) discloses a pasta extruder for forming strand-like pasta. There is also an extrusion die plate with numerous apertures within the extruder housing and adjacent to a pressure chamber. U.S. D543802 S (Fuchs) discloses a kabob cutting board with what appear to be skewers attached at one end to the upper surface of a board. All skewers align parallel to each other, and with their opposing ends extending from the board.

None of the above devices exhibit a removable attachment for a pressure generating device which, while acting as a conduit for extruded food, also shapes and compresses the food along a longitudinal device such as a skewer. Furthermore, none of the above device exhibit sufficient flexibility to retrofit existing devices, or are specifically adapted to both manual or electrical, or otherwise operable pressure generating devices. Nor are the above devices the structurally adaptable to future pressure generating device designs. There is also no need to attach a casing or covering to the extruded food to prevent the food from falling from a skewer, because the food is sufficiently compressed to adhere without additional devices.

SUMMARY OF THE INVENTION

The current invention is directed to the combination of a pressure generating device and a removable attachment for compressing and shaping food upon a physically separate cooking tool such as a skewer. The pressure generating device can be of conventional design and extrudes food from the device's interior. The food is generally located within a container which can be of many shapes and sizes.

In manually operated models the pressure is initially generated by an elongated handle attached to rotating parts with engaging teeth and gears. In the preferred manual embodiment, when the consumer initially turns the elongated handle this rotational movement rotates teeth of an adjoining cap gear. These teeth engage teeth of a T-gear and thereby generate rotational movement of this perpendicular T-gear. Rotation of this T-gear becomes rotational and downward movement of a piston rod, because the piston rod is partially enclosed by the T-gear.

The lower end of the piston rod attaches to a pressure disk which loosely contacts the interior surface of the container along its entire periphery. The lower surface of the pressure disk contains a disk. This disk acts as an air release mechanism. It also prevents residual food from moving upward whenever the elongated handle rotates and pulls the piston rod and disk upward from the container bottom.

At the bottom wall section of the container is a large circular aperture which is enclosed by a threaded continuous wall. This wall preferably is a cylindrical segment. The threaded cylindrical wall is an integral part of the pressure generating device, usually the container, and can be welded to the container exterior wall. In the present invention, the aperture is continuous with a removable food compressing attachment. The food compressing attachment is structurally adapted to compress and shape food to a distinct continuous mass along a longitudinal cooking tool. The food compression occurs within the attachment in continuous increments which are limited by the length of the cooking tool which is usually, but not necessarily, a skewer.

In operation, the food is compressed down through the container by pressure disk as it moves with the attached downwardly moving piston toward the container bottom surface. The compressed food has no exit but the large aperture through which it moves into the food compressing attachment. Within the food compressing attachment a longitudinal cooking tool is aligned through (a) a small slit and (b) opposing oblong opening, so that the longitudinal cooking tool is axially perpendicular to the flow of food from the large aperture.

The food compression attachment has an attachment interior. The attachment interior exhibits contours of two continuous chambers. The first continuous chamber is circular in cross-section and continuous with the large circular aperture. The second continuous chamber is oblong in cross-section, and adjacent the oblong opening through which a longitudinal cooking tool extends.

As the longitudinal cooking tool moves through the attachment, and perpendicular to the food flow from the large container aperture, food is further compressed upon it within the second chamber and an oblong slot prior to leaving the attachment interior. The two continuous chambers and oblong opening ensures that extruded food adheres in a consistent continuous shape to the longitudinal cooking tool. The consumer continues to press the food within the container (by rotating the handle) and simultaneously slide the longitudinal cooking tool through the attachment. This process continues until all food is compressed onto the longitudinal cooking tool or the length of the tool is exhausted.

The pressure generating device may be manual, electrical, or otherwise operated by currently available or future alternative energy sources. Although the preferred embodiment device is manually driven, other prototypes and models are also within the scope of the invention. Preferably these prototypes must be capable of (1) operatively retrofitting with the food compression attachment; or (2) otherwise be operative with food compressing attachments. The technologies for construction of the actual food compressing attachment are well known in the plastics, metallurgist, machinist, resin extrusion, and molding industries.

Consequently it is a goal of this invention to retrofit a food compressing attachment for compressing food to a longitudinal cooking tool to prior devices for extruding food.

It is another goal of this invention to provide an attachment for compressing food to a skewer, and which food compressing attachment is easily removed, cleaned and economical to produce.

It is another purpose of this invention to provide an attachment for shaping and compressing food along a longitudinal cooking device as a continuous and uniform product upon the longitudinal cooking device.

It is another purpose of this invention to provide a method for shaping and compressing food along a longitudinal cooking tool which does not require a casing or other wrapping enclosing the food.

These and other advantages of the invention will become apparent from the detailed description of the invention and figures as indicated below.

BRIEF DESCRIPTION OF THE DRAWINGS

FIG. 7 is a cutaway view of the pressure generating device and food compressing attachment in operation with a longitudinal cooking tool.

DETAILED DESCRIPTION OF THE PREFERRED EMBODIMENT AND OTHER EMBODIMENTS OF THE INVENTION

Figure 1:
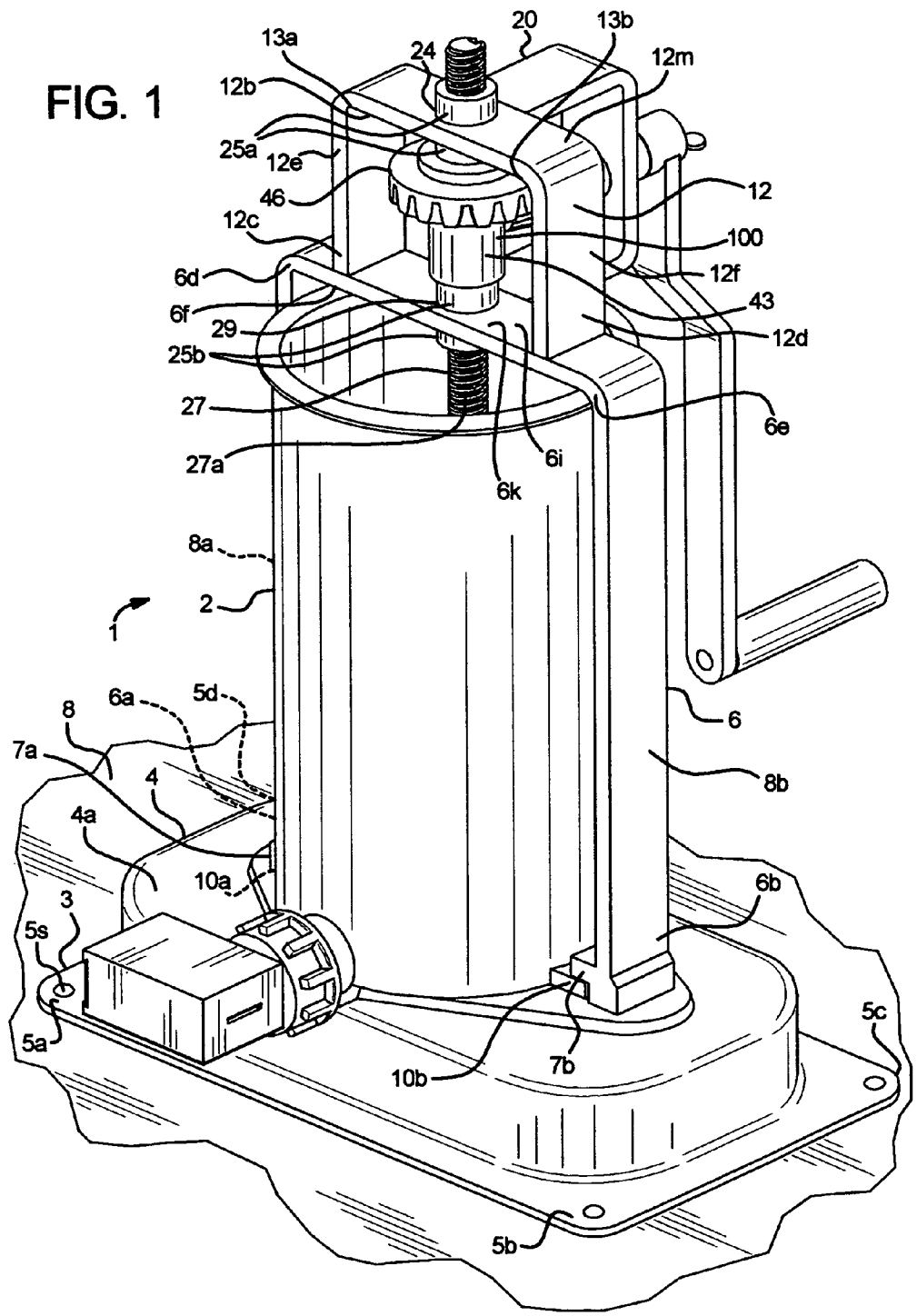
FIG. 1 is a partial anterior view of a prior art manually operated pressure generating device and food compressing attachment.

Referring to FIG. 1, in the preferred embodiment prior art pressure generating device 1 comprises a container 2. Container 2 is preferably round in cross-section and made of metal, but other cross-sectional configurations and materials are also acceptable. Container 2 is preferably mounted upon base 3, and base 3 consists of an elevated oblong component 4. Base 3 also consists of first, second, third and fourth flat continuous corner flanges 5a, 5b, 5c, 5d respectively [hereinafter continuous corner flanges 5].

Continuous corner flanges 5 each comprise corner apertures 5s or other structures by which pressure generating extruding device 1 attaches to a stable horizontal surface such as table top 8. Preferably base 3 is approximately six inches in width and nine and one-half inches in length. Base 3 is preferably approximately one and one-half inches in height within the area covered by elevated oblong component 4. Continuous corner flanges 5 and elevated oblong component 4 are each preferably approximately one-sixteenth inch in uniform thickness.

Still referring to FIG. 1, attached to upper elevated oblong component surface 4a is first lower end 6a and second lower end 6b of rigid partial rectangular strip 6. Partial rectangular strip 6 has first and second strip right angles 6d, 6e respectively along inner strip surface 6f. Partial rectangular strip 6 is attached at each first and second lower end 6a, 6b respectively by first and second threaded screws with hexagonal nuts 6s and 6t respectively (not seen). Each lower end 6a, 6b along inner surface 6f comprises a first and second inwardly extending tab 7a, 7b respectively. Each inwardly extending tab 7a, 7b is preferably approximately three-quarters inch in width, one and one-quarter inches in length and one-half inch in thickness.

Partial rectangular strip 6 also comprises a first strip leg 8a and second strip leg 8b. Strip legs 8a and 8b oppose each other along upper elevated oblong surface 4a at approximately 180 degrees. Partial rectangular strip 6 is approximately twenty-five inches in total extended length and approximately one-eighth inch in thickness. Partial rectangular strip 6 is preferably made of steel, but materials are also satisfactory. Each strip leg 8a, 8b is approximately nine and one-half inches in length.

Figure 2:
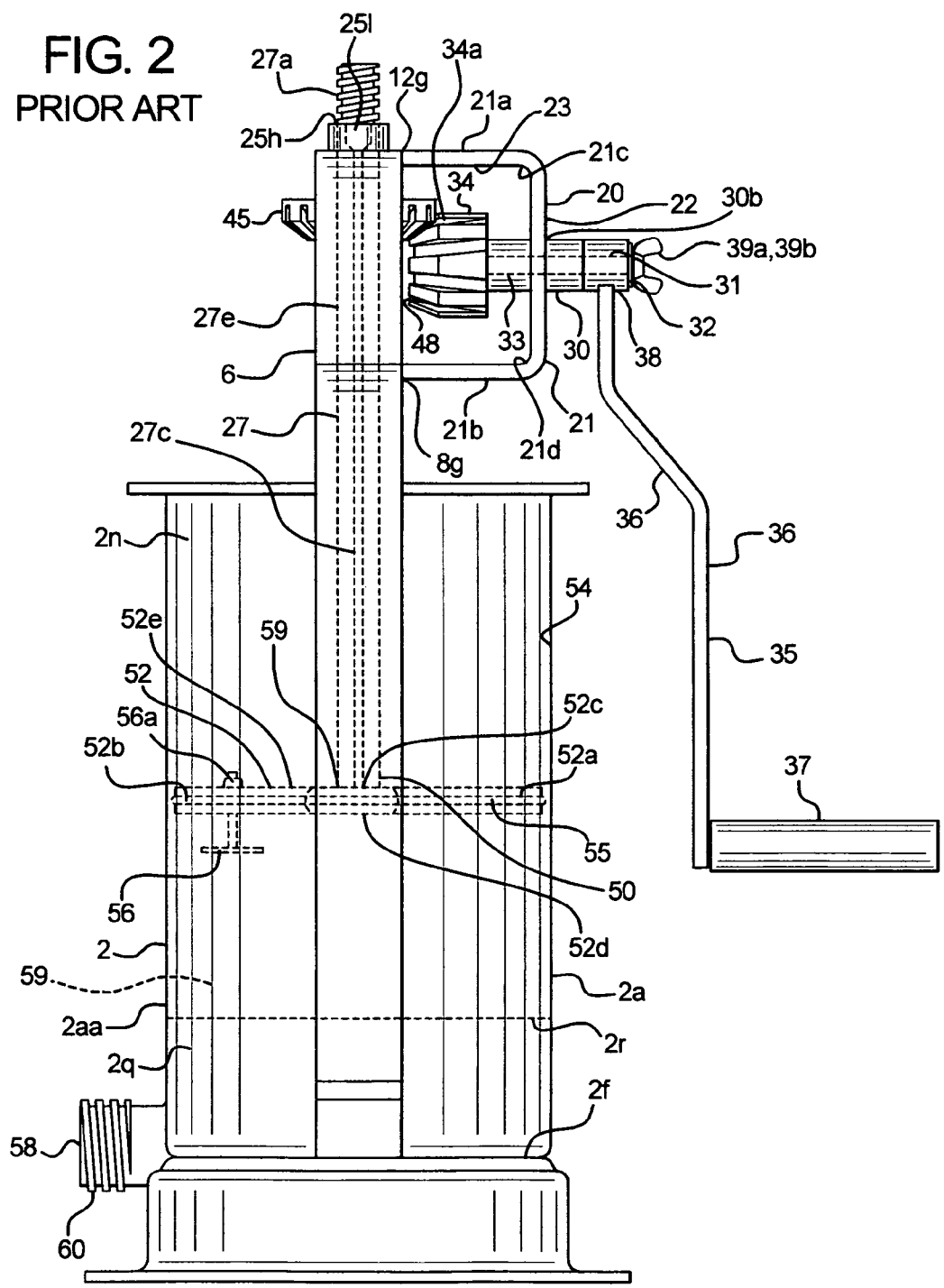
FIG. 2 is a lateral view of the prior art manually operated pressure generating device of FIG. 1 without an attachment.

Referring to FIGS. 1 and 2, positioned between first strip leg 8a and second strip leg 8b of partial rectangular strip 6 is container 2. Container 2 is preferably approximately: five inches in inner diameter, eight and one-quarter inches in height, and one-sixteenth inch in wall thickness 2n. However, other cross-sectional shapes, diameters, and heights are satisfactory in other embodiments. The material of choice is stainless steel, but other materials are also satisfactory.

Container 2 comprises first and second container extensions 10a, 10b respectively at container bottom surface 2b. Container extensions 10a, 10a oppose each other at approximately 180 degrees. Each opposing container extension 10a, 10b fits beneath each corresponding first and second inwardly extending tabs 7a, 7b respectively, thereby stabilizing base 3 and container 2. Each first and second opposing container extension 10a, 10b respectively is approximately one-half inch in width, one and one-tenth inches in length, and one-quarter inch in thickness.

Referring to FIG. 1, attached to rectangular upper surface 6i of rigid partial rectangular strip 6 is rigid second smaller partial rectangular strip 12. Rigid second smaller partial rectangular strip 12 has a first lower small strip end 12c and a second lower small strip end 12d. Each lower strip end 12c, 12d is preferably permanently welded to rectangular upper surface 6i. Second smaller partial rectangular strip 12 has a first smaller upper surface 12m and a second smaller lower surface 12b.

First smaller rectangular leg 12e and second smaller rectangular leg 12f are formed by first and second smaller bends 13a, 13b respectively in rigid second smaller rectangular strip 12. Each smaller small bend 13a, 13b is approximately 90 degrees along second smaller lower surface 12b. Each smaller partial rectangular strip 12 is preferably approximately ten inches in total fully extended length, one and one-eighth inches in width, and one-quarter inch in thickness. First smaller rectangular leg 12e and second smaller rectangular leg 12f oppose, and are parallel to, each other. Each smaller rectangular leg 12e, 12f is approximately three inches in length. Each smaller rectangular leg 12e, 12f is preferably welded to upper partial rectangular strip surface 6i, and approximately one inch from each corresponding strip right angle 6d, 6e.

Referring to FIGS. 1 and 2, in the preferred embodiment rigid third smallest partial rectangular strip 20 has a first horizontal leg 21a and a second horizontal leg 21b. Third rectangular strip segment 22 is perpendicular to each horizontal leg 21a, 21b and is formed by first smallest rectangular bend angle 21c and a second smallest rectangular bend angle 21d. Each smallest rectangular bend angle 21c, 21d is approximately 90 degrees along lower surface 23 of third partial rectangular strip 20. Each horizontal leg 21a, 21b attaches to second smaller rectangular strip surface edge 12g and partial rectangular strip edge 8g respectively. Third smallest partial rectangular strip 20 protrudes perpendicular, and posterior, to first partial rectangular strip 6 at posterior 2a to container 2.

Third smallest partial rectangular strip 20 is preferably approximately seven inches in total extended length, one and one-quarter inches in width, and one quarter inch in thickness. Third smallest partial rectangular strip 20 is preferably made of steel but other materials are also satisfactory. Each horizontal leg 21a, 21b is equal in length to, and opposes the other in parallel fashion. Each horizontal leg 21a, 21b is perpendicular to partial rectangular strip middle segment 6k.

Referring to FIG. 1, at the midpoint of second smaller partial rectangular middle segment 12m is second smaller partial rectangular aperture 24. Second smaller partial rectangular aperture 24 is preferably approximately three-quarters inch in diameter. Second smaller rectangular aperture 24 contains permanently first fixed hollow cylindrical segment 25a which protrudes approximately one-half inch axially from second smaller partial rectangular aperture 24 in both upward and downward directions.

First fixed hollow cylinder 25a is approximately three-eighths inch in diameter, one and one-quarter inches in axial length, and one-sixteenth inch in cylindrical wall thickness. First hollow fixed cylinder 25a is preferably made of steel, but other materials are also satisfactory. First fixed hollow cylinder 25a is preferably welded within second small aperture 24.

Second fixed hollow cylinder 25b extends to and through partial rectangular aperture 29 which is located at the midpoint of partial rectangular middle segment 6k. Second hollow fixed cylinder 25b is preferably welded within partial rectangular aperture 29. Second hollow fixed cylinder 25b extends axially approximately one-half inch in both downward and upward from partial rectangular aperture 29. Fixed hollow cylindrical segments 25a, 25b are co-axially aligned with each other, but they are not adjacent to each other.

Referring to FIGS. 1 and 2, enclosed within each first and second fixed hollow cylinder 25a, 25b respectively is rigid piston rod 27. Rigid piston rod 27 is preferably approximately fourteen inches in axial length and approximately one-half inch in diameter. Preferably rigid piston rod 27 bears a threaded surface 27a along its entire axial length. Each thread of threaded surface 27a is interrupted by a continuous longitudinal groove 27c with a flat bottom floor. Longitudinal groove 27c extends along entire piston longitudinal axial length 27e.

First hollow fixed cylinder 25a comprises a tongue 251 along fixed cylinder upper edge 25h. Tongue 251 protrudes into continuous longitudinal groove 27c, and thereby tongue 251 prevents piston rod 27 from rotating around its own piston axis. Rigid piston rod 27 traverses apertures 24 and 29, and moves linearly downward or upward through apertures 24, 29.

Still referring to FIGS. 1 and 2, T-gear 43 encloses piston rod 27 between first fixed hollow cylinder 25a and second fixed hollow cylinder 25b. T-gear 43 comprises circular stem 100 and upper circular end circumference 46. T-gear 43 is in direct physical contact with piston rod 27. T-gear 43 is positioned perpendicular to, and between, parallel partial rectangular middle segment 6k and second smaller rectangular middle segment 12m. T-gear circular stem 100 is aligned perpendicular to first and second horizontal legs 21a, 21b respectfully. T-gear 43 comprises ratcheting teeth 45 along upper circular end circumference 46. T-gear 43 is preferably approximately two inches in total length and two and one-half inches in diameter at upper circular end circumference 46. T-gear 43 is approximately one and three-tenths inches in diameter through circular stem 100.

Referring to FIG. 2, through the smallest partial rectangular middle segment midpoint is third smallest partial rectangular aperture 30b. Third smallest partial rectangular aperture 30b contains rigid third fixed hollow cylinder 30. Third fixed hollow cylinder 30 is preferably welded within third smallest partial rectangular aperture 30b. Third rigid hollow cylinder 30 is preferably approximately three quarters of an inch in diameter, one and three-eighths inches in length, and has a cylindrical wall thickness of one-sixteenth inch. Third fixed hollow cylinder 30 is preferably made of steel, but other materials are satisfactory. Third fixed hollow cylinder 30 protrudes approximately three-quarters inch anterior and three-quarters inch posterior to third smallest partial rectangular aperture 30b. The long axis of third fixed hollow cylinder 30 is perpendicular to third smallest partial rectangular segment 21.

Enclosed within third rigid hollow cylinder 30 is horizontal end cap gear 34 with cylindrical threaded bore 32. Horizontal endcap gear 34 is preferably approximately two and one-half inches in length and one-half inch in maximum diameter. Horizontal end cap gear 34 is preferably made of rigid rubber, but other materials are also satisfactory. Horizontal end cap gear 34 protrudes anterior from third fixed hollow cylinder 30.

Horizontal end cap gear 34 has one solid stem end 33 and one solid end cap gear end 34a. Solid stem end 33 is partially enclosed by rotating handle 35 with curved handle stem 36, horizontal hand grasp 37 and integral semi-cylindrical end piece 38. Rotating handle 35 attaches to solid stem end 33 at integral continuous semi-cylindrical end piece 38 with winged threaded screw 39a and washer 39b. Winged threaded screw 39a inserts into and threads within cylindrical threaded bore 32.

Still referring to FIG. 2, interior solid end cap gear end 34a bears solid gear ratcheting teeth 48. A bushing (not seen) extends between third fixed hollow cylinder 30 and horizontal endcap gear 34. Solid gear ratcheting teeth 48 are perpendicular to, and mesh with, ratcheting teeth 42 along T-gear 43. Horizontal endcap gear 34 rotates within third fixed hollow cylinder 30.

Referring to FIG. 2, attached to piston rod 27 towards threaded piston lower end 50 is pressure disk 52. Pressure disk 52 is preferably circular in shape, approximately four and three-quarters inches in diameter, and approximately seven-eighths inch in thickness. Pressure disk 52 comprises a disk O-ring or gasket 55 along disk circumference 52a within groove 52b. Pressure disk 52 is preferably made of rigid plastic which is dishwasher safe, but other materials are also suitable if they are rigid and dishwasher safe. Disk circumference 52a moveably abuts container inner surface 54 at all points thereon.

Pressure disk 52 also contains circular disk interior section 52c with centrally located threaded disk aperture 57. Threaded piston lower end 50 inserts tightly within centrally located threaded aperture 57, thereby attaching threaded piston rod 27 to pressure disk 52. Pressure disk 52 also has a disk upper surface 52c and a disk lower surface 52d. Disk lower surface 52d preferably has disk spacer 56 which attaches to disk lower surface 52d with screw or nut 56a.

Figure 3:
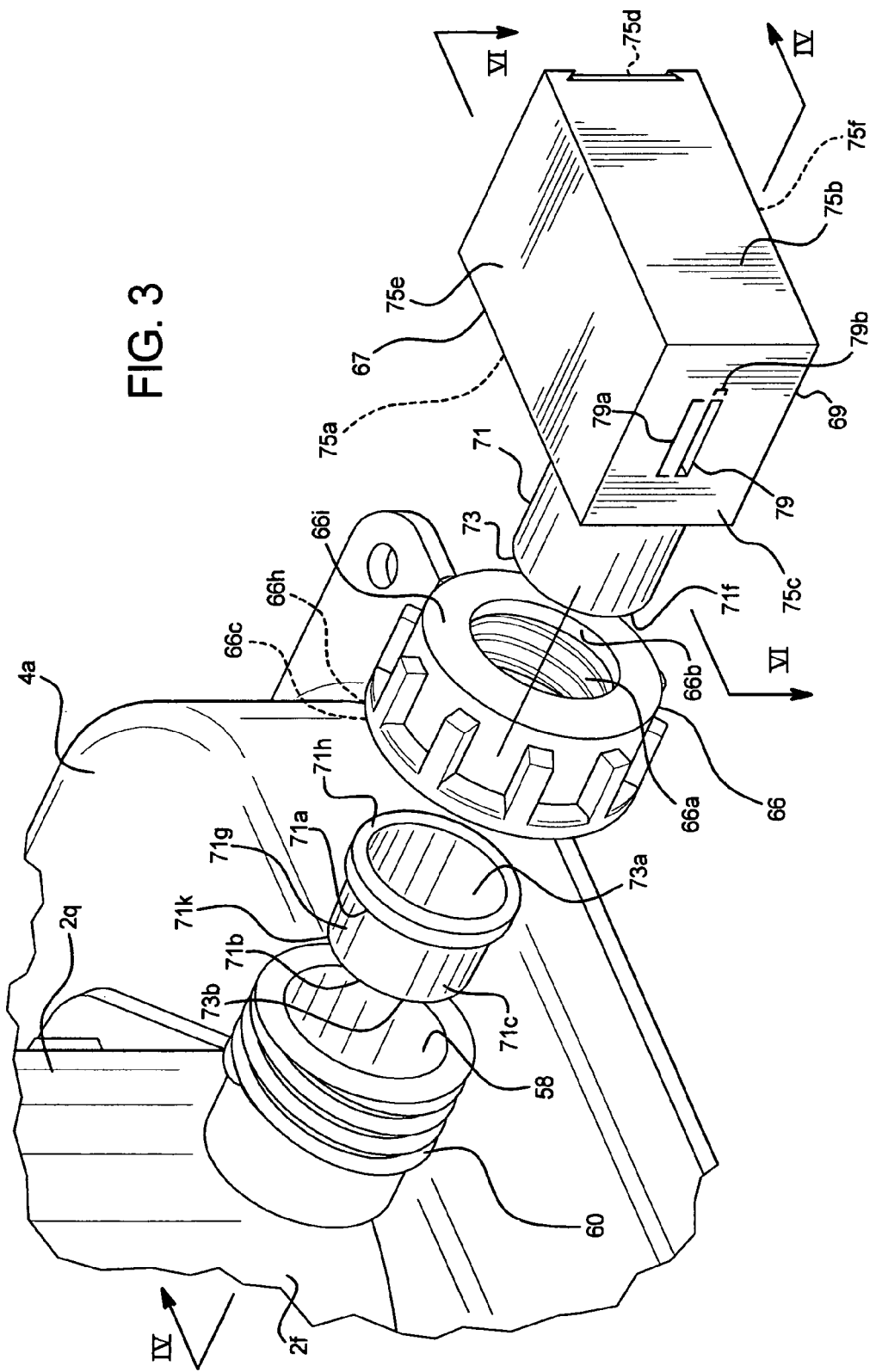
FIG. 3 is an exploded view of a container's extrusion opening, threaded adaptor, end cap with lip, and food compressing attachment.

Referring FIGS. 2 and 3, container 2 comprises lower container wall portion 2q. Lower container wall portion 2q comprises the container surface area from bottom container surface 2f to container circumference wall periphery 2r. Each point of bottom container surface 2f is approximately three-quarters inch from container wall periphery 2r. Container extruder opening 58 is located within lower container wall portion 2q. Container extruder opening 58 lies approximately 180 degrees from elongated handle 35, namely, at anterior 2aa of container 2 and posterior to protruding third smallest rectangular strip 20.

Figure 4:
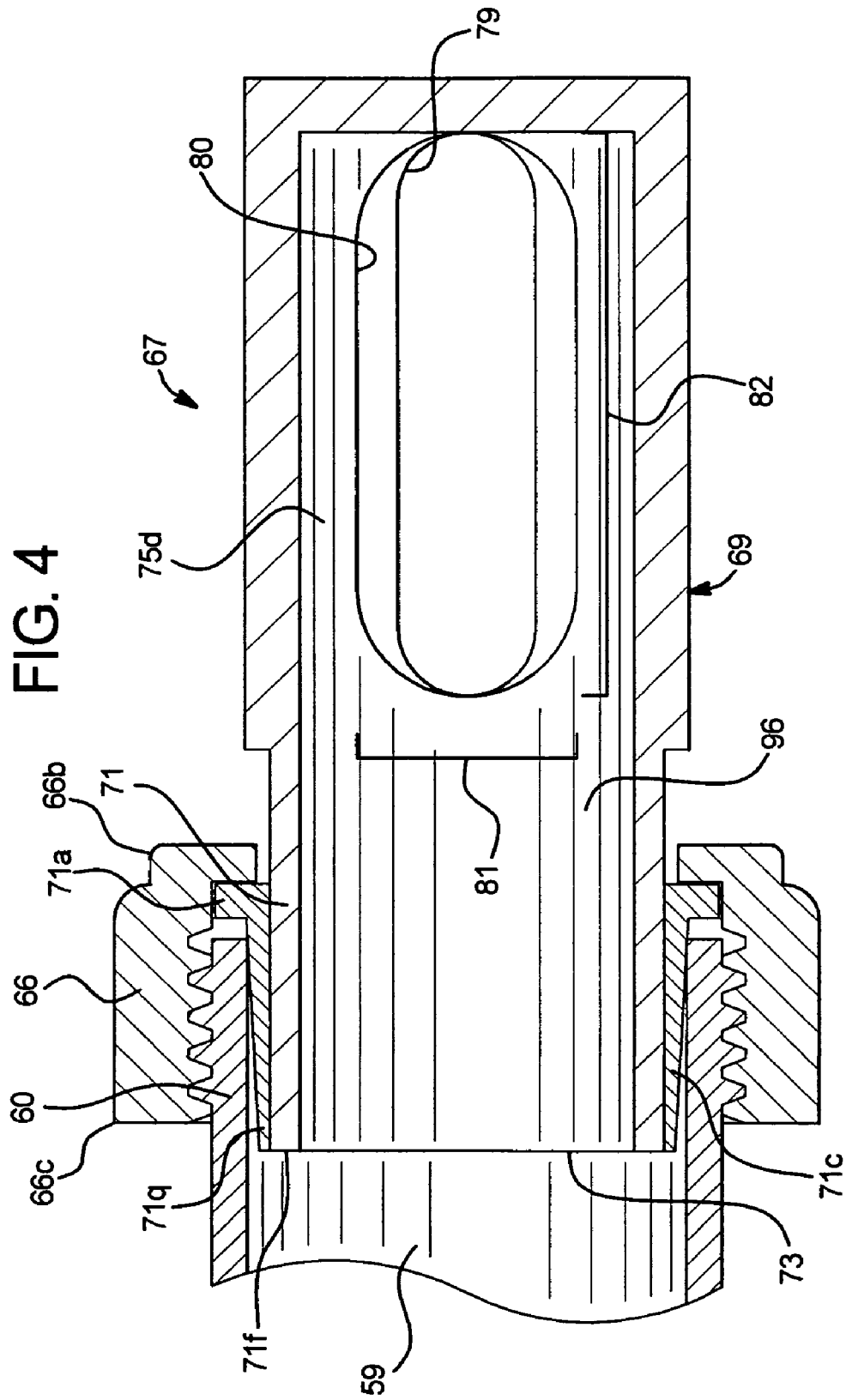
FIG. 4 is a cross-sectional view of food compressing attachment through view line IV-IV of FIG. 3.

Container extruder opening 58 is preferably circular and approximately one and one-quarter inches in inner diameter. In the preferred embodiment container extruder opening 58 is circumscribed by protruding threaded cylindrical segment 60. Threaded cylindrical segment 60 is preferably welded to container exterior surface 2f and has a cylindrical segment wall thickness of approximately three-sixteenths inch. As best seen in FIG. 4, container circular aperture 58 is continuous with container interior volume 59.

Referring to FIG. 3, in the preferred embodiment food compressing attachment 67 contains rectangular three dimensional component 69. Rectangular three-dimensional component 69 is preferably approximately: one and three-eighths inches in width; two inches in height; and two and one-half inches in length. Rectangular three dimensional component 69 is preferably made from rigid plastic or metal which is dishwasher safe and easily cleaned. However, other materials are satisfactory if they are dishwasher safe and easily cleaned.

Still referring to FIG. 3, attachment aperture 73 is circumscribed by attachment cylindrical wall 71. Attachment aperture 73 is preferably circular but different shapes are possible in other embodiments. In the preferred embodiment, attachment cylindrical wall 71 consists of a distal cylindrical wall edge 71f. Attachment cylindrical wall 71 is preferably approximately one inch in interior diameter and approximately one and one-quarter inches in length.

Enclosing attachment cylindrical wall 71 at distal cylindrical wall edge 71f is attachment end cap 71c. Attachment end cap 71c has opposing and axially aligned first and second end cap apertures 73a and 73b respectively. First end cap aperture 73a is located at first end cap edge 71h, and second end cap aperture 73b is located at second end cap edge 71k. Attachment end cap 71c is made preferably made of flexible plastic which is easily cleaned and dishwasher safe. Attachment end cap 71c is preferably approximately: one and one-eighth inch in minimum inner diameter at second end cap edge 71k, one and three-sixteenths inches in maximum inner diameter at first end cap edge 71h, and one-half inch in length.

Still referring to FIG. 3, attachment end cap 71 consists of integral attachment lip 71a at its widest diameter first end cap edge 71h. Attachment end cap 71 also consists of a cylindrical end cap stem 71g which gently tapers to second end cap edge 71k from first end cap edge 71h. Attachment lip 71a is preferably approximately: three-sixteenths inch in width and three-sixteenths inches in height. Cylindrical end cap stem 71g is preferably approximately one-half inch in length.

Prior art threaded adaptor 66 is preferably circular with a threaded interior surface 66a and is made of rigid plastic. Threaded adaptor 66 has an adaptor minimum diameter circular edge 66b which is preferably approximately one inch in inner diameter. Threaded adaptor 66 has a maximum diameter circular edge 66c which is preferably approximately one and one-half inches in inner diameter. Threaded adaptor 66 also has an inwardly protruding first adaptor lip 66h and an inwardly protruding second adaptor lip 66i. Second adaptor lip 66i is preferably approximately five-sixteenths inch in width, while first adaptor lip 66h is approximately three-eighths inch in width.

To assemble adaptor 66, end cap 71c and attachment cylindrical wall 71, threaded adaptor 66 first slides over attachment cylindrical wall 71. Next, attachment end cap 71c slides over and encloses attachment cylindrical wall 71 through first and second end cap apertures 73a, 73b respectively. In attachment end cap 71c's enclosing position, attachment lip 71a is the structure most proximal to rectangular three-dimensional component 69. Also in the proper enclosing position, distal end cap edge 71k is flush with distal cylindrical wall edge 71f.

End cap lip 71a must also snap into inner diameter adaptor edge 66b along second adaptor lip 66i. So attached, threaded adaptor 66 can simultaneously connect to threaded aperture wall 60 by threaded adaptor interior 66a. In the preferred embodiment, end cap 71c is permanently adhered to attachment cylindrical wall 71. In other embodiments a bushing inserts between end cap 71c and attachment cylindrical wall 71, thereby creating a tight fit.

Still referring to FIG. 3, preferably rectangular three dimensional components 69 consists of six rectangular faces. First narrow rectangular face 75a opposes, and is parallel to, second narrow rectangular face 75b. First narrow rectangular face 75a contains attachment aperture 73 with attachment cylindrical wall 71. Each narrow first and second rectangular face 75a, 75b respectively is preferably approximately two and one-half inches in length, and one and one-half inches in width.

Each third and fourth narrow rectangular face 75c, 75d respectively is preferably approximately two inches in length, and one and one-quarter inches in width. Each first and second broad rectangular face 75e, 75f respectively is preferably approximately two inches in width and two and one-half inches in length. Fourth narrow rectangular face 75d—together with rectangular faces 75a, 75b, 75c supra, first broad rectangular face 75e and second broad rectangular face 75f—form three-dimensional component 69 as a continuous rectangular solid. Attachment component 69 is integral, and continuous with, attachment cylindrical wall 71. Attachment cylindrical wall 71 protrudes from three-dimensional component 69 at an angle of approximately 90 degrees.

Referring to FIGS. 3 and 4 centrally positioned within perpendicular third narrow rectangular face 75c is narrow slot 79. Narrow slot 79 is preferably approximately three-quarters of an inch in slot axial length 79a, and one-eighth inch in slot width 79b. Slot axial length 79a is approximately parallel to opposing fourth narrow rectangular face 75d referring to FIGS. 4 and 5, fourth narrow rectangular face 75d contains food shaping oblong opening 80. Food shaping oblong opening 80 is preferably approximately: five-eighths inch in maximum width 81, and one and five-eighths inches in maximum oblong length 82. Oblong opening 80 opposes, and is congruent with, narrow slot 79 within narrow rectangular face 75c.

Figure 5:
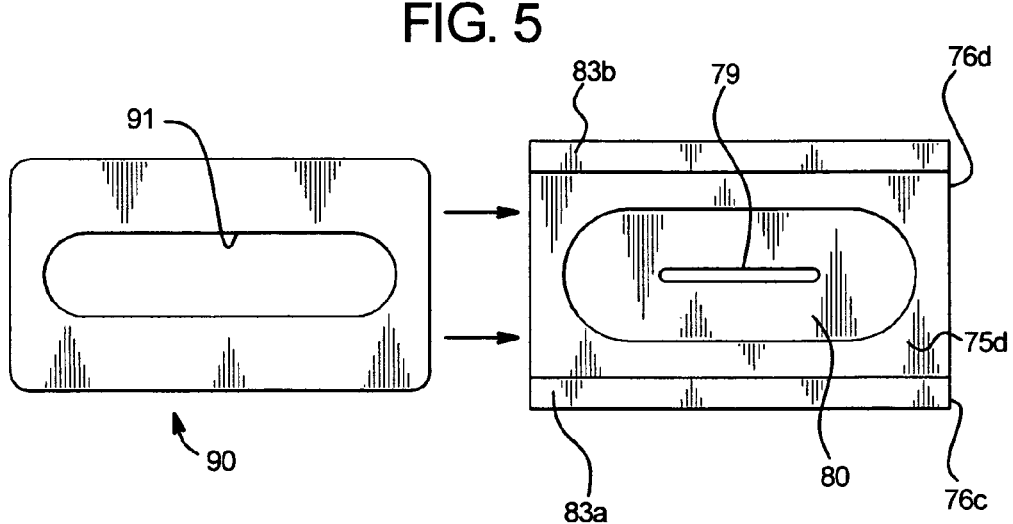
FIG. 5 is a top plan schematic view of the food compressing attachment and template.

Referring to FIG. 5, fourth narrow rectangular face 75d also preferably contains first and second raised tracks 83a and 83b respectively along first and second attachment edges 76c and 76d respectively. Raised tracks 83a, 83b are parallel to each other, oppose each other and are parallel to the maximum oblong length 82 of food shaping oblong opening 80. Each raised track 83a, 83b is of the same dimensions as the other, and preferably each raised track 83a, 83b is approximately one-eighth inch in height and three-sixteenths inch in width.

Still referring to FIG. 5, raised tracks 83a, 83b can detachably contain removable template 90. Removable template 90 is preferably a thin metal segment which is approximately one-sixteenth inch in thickness and with the same length and width as fourth narrow rectangular face 75d. Removable template 90 contains template oblong opening 91.

Template oblong opening 91 is preferably approximately: seven-sixteenths inch in maximum width, and one and one-half inches in maximum length. Removable template 90 inserts within raised tracks 83a, 83b and can move linearly within. Such movement superimposes template oblong opening 91 over food shaping oblong opening 80, thereby decreasing the area through which food is compressed from rectangular three-dimensional component interior 96.

Figure 6:
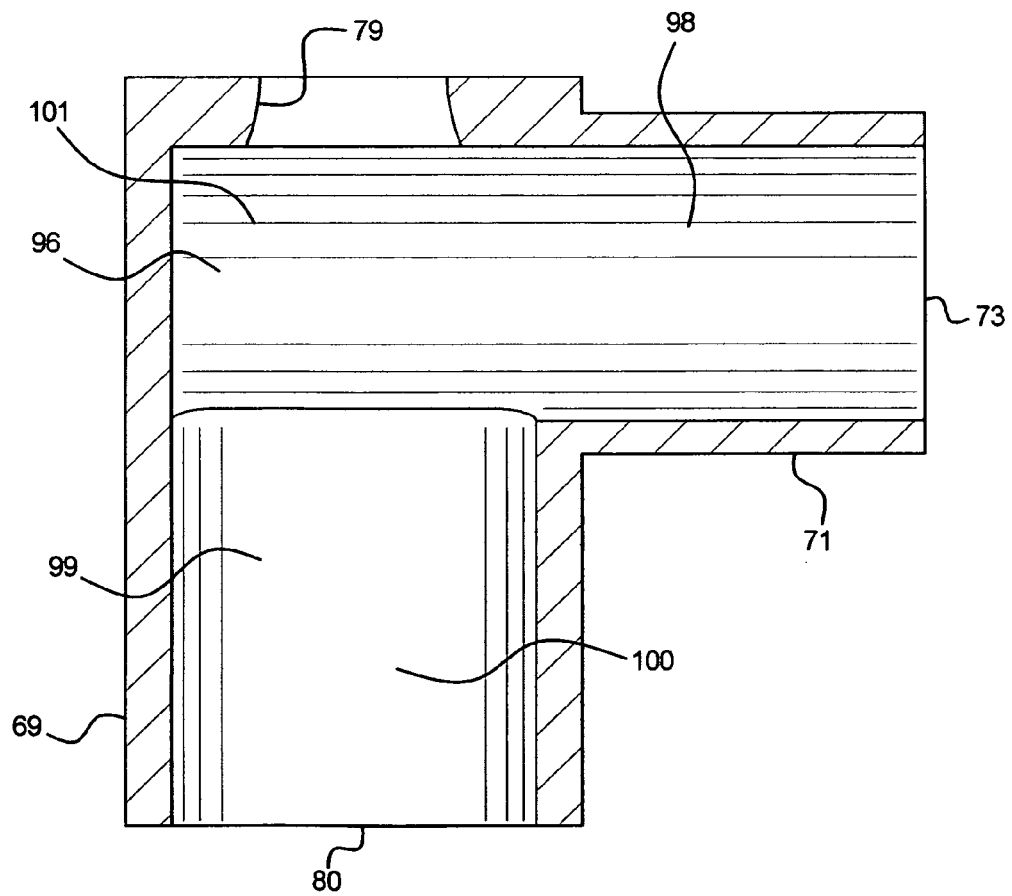
FIG. 6 is a longitudinal cross-sectional view of food compressing attachment from view line VI-VI of FIG. 3.

Referring again to FIG. 4, food shaping oblong opening 80 and narrow slot 79 are each continuous with rectangular three-dimensional attachment component interior 96. Attachment circular aperture 73 is continuous with rectangular three-dimensional component interior 96. Referring to FIG. 6 rectangular three-dimensional component interior 96 forms an attachment first chamber 98 which is continuous with attachment second chamber 99.

Still referring to FIG. 6 first attachment chamber 98 is continuous with, and immediately adjacent to, attachment aperture 73 and narrow slot 89. Attachment second chamber 99 is continuous with, and immediately adjacent to, oblong opening 80. Attachment first chamber 98 is cylindrical in configuration and preferably approximately: seven-eighths inch in diameter and one and three-quarters inches in length. Attachment second chamber 99 is positioned perpendicular to, continuous with, and immediately adjacent to, first attachment chamber 98.

Attachment second chamber 99 is oblong in cross-sectional shape and so second chamber 99 has a shallower, flatter, and wider floor 100 than attachment first chamber 98. Attachment first chamber floor 101 preferably consists of a cylindrical cross-section, as does attachment first chamber ceiling 102 (not seen). Attachment second chamber 99 is preferably approximately one and three-eighths inches in length; one and three-quarter inches in width; and three-eighths inch in depth. All surfaces of first and second chambers 98, 99 are preferably smooth, and with no sharp edges, as are the remaining surfaces of attachment interior 96.

Food compressing attachment 67 is preferably made of UHMW Plastic and 316 SS. In the best mode and preferred embodiment of the invention the machine for producing food compressing attachment 67 is a CNC horizontal lathe with CNC vertical milling center.

Operation of Pressure Generating Device and Food Compressing Device In the Preferred Embodiment and Best Mode Referring to FIG. 7, container 2 on base 3 attaches to a table or other stable horizontal surface 8 with well known mechanical attaching devices, such as C-clamps. The consumer then attaches food compressing attachment 67 to container 2 by first sliding threaded adaptor 66 over attachment cylindrical wall 71, as described supra. End cap 71 then slides over attachment cylindrical wall 71 and snaps into the bottom adaptor lip 71*k* as described supra. A bushing can first be inserted between attachment cylindrical wall 71 and end cap 71*c*; or cylindrical wall 71 and end cap 71 can be adhered to each other. This initial assembly creates the continuous sealed food passageway between container cylindrical segment 60 and attachment cylindrical wall 71.

Still referring to FIG. 7, the consumer next inserts long longitudinal cooking tool 100, preferably skewer 100*a*, through food shaping oblong opening 80 and small slot 79. The consumer then rotates handle 35 clockwise, which in turn rotates solid gear teeth 48. Solid gear teeth 48 mesh with T-gear teeth 45 to rotate T-gear 43. This rotational movement of T-gear 43 *s* translates to downward movement of threaded piston rod 27 and attached circular disk 52.

Still referring to FIG. 7, rigid piston rod 27 and attached circular disk 52 moves downward through container 2 until disk spacer 56 abuts container bottom interior surface 2*f*. As pressure disk 52 moves downward through container 2, disk 52 exerts pressure upon the food within container 2, such as ground meat 199. Compressed ground meat 199 cannot release this transferred downward pressure, unless it extrudes through container extruder opening 58 and attachment circular aperture 73.

As compressed ground meat 199 leaves attachment circular aperture 73, it enters rectangular three-dimensional component interior 96 as first attachment chamber 98. Simultaneously long longitudinal cooking tool 100 lies within rectangular three-dimensional component interior 96 perpendicular to the direction of meat flow 101. For purposes of this discussion, longitudinal cooking tool 100 is divided into longitudinal segments 102. Each longitudinal segment 102 is the length of three-dimensional component 69 between oblong opening 80 and narrow longitudinal slot 79.

Still referring to FIG. 7, ground meat 199 initially encloses, and is compressed upon, cooking tool segment 102 within first attachment chamber 98. The consumer moves longitudinal cooking tool 100 through interior 96 between narrow slot 79 and food shaping oblong opening 80 in the direction of arrows 120 and 121. Each longitudinal cooking tool segment 102 emerges from oblong opening 80 enclosed by compressed ground meat 199. Each longitudinal cooking tool segment 102 is continuous with previous cooking tool segments 102, and successive cooking tool segments 102, along the same longitudinal cooking tool 100.

While moving through three-dimensional component interior 96, compressed ground meat 199 initially fills first cylindrical attachment chamber 98. As ground meat 199 moves through second attachment chamber 99 the cylindrically shaped meat volume is further compressed into a flatter, oblong shape in cross-section. Movement of ground meat 199 through rigid oblong opening 80 sustains the compressed configuration of ground meat 199 because it has the same dimensions as second attachment chamber 98.

Consequently ground meat 199 adheres to longitudinal cooking attachment 100 as it exits food compressing attachment 67. Ground meat 199 within attachment 67 is sufficiently compressed so that a standard sausage casing, or other meat or food wrap, is unnecessary. For a smaller cross-section of continuous ground meat 199 upon long cooking tool 100, the consumer slides removable template 90 through raised tracks 83*a*, 83*b* prior to commencing the operation.

To reverse the pressure and add additional food to container 2, the consumer turns elongated attached handle 35 counter-clockwise. This movement causes end cap teeth 48 to engage T-gear teeth 44 in the opposite direction and thereby threaded piston rod 27 and pressure disc 52 now move upward and away from bottom surface 2*f*. Disk spacer 56 prevents residual ground meat 199 from moving upward from bottom surface 2*f*.

The above preferred embodiment, other embodiments, best mode, and other modes are by way of illustration only. The above described best mode and preferred embodiment do not limit the scope of the invention. The scope of the invention includes presently existing and future pressure generating devices which retrofit with our food compressing attachment 67. Similarly, variations of our food compressing attachment 67 are also within the scope of the invention and include metal compressing attachments 67 as well as plastic prototypes.

The invention claimed is:

1. A pressure generating device in physical combination with a food compressing attachment, said food compressing attachment comprising
   a conduit, said conduit comprising surfaces, said surfaces compressing food within said conduit upon a longitudinal cooking tool in a continuous manner, said food compressing attachment being reversibly removable from said pressure generating device, said conduit being physically continuous with said pressure generating device,
   and
   a retrofitting component whereby said food compressing attachment attaches to one of a group consisting of a plurality of said pressure generating devices.

2. A pressure generating device in physical combination with a food compressing attachment, said food compressing attachment comprising
   a conduit, said conduit comprising surfaces, said surfaces compressing food within said conduit upon a longitudinal cooking tool in a continuous manner, said food compressing attachment being reversibly removable from said pressure generating device, said conduit being physically continuous with said pressure generating device, and
   a retrofitting component whereby said food compressing attachment attaches to one of a group consisting of a plurality of said pressure generating devices
   said combination further comprising a reversibly removable threaded adaptor, said pressure generating device further comprising a container, said container further comprising a circular aperture, and
   said food compressing attachment comprising an attachment cylindrical wall, said attachment cylindrical wall adapted to physically and continuously connect to said circular aperture.

3. A food compressing attachment combined with a pressure generating device, said food compressing attachment made of a material that is manually and dishwasher cleaned, and said food compressing attachment comprising
   A. A three-dimensional component, said three-dimensional component further comprising
   1. an attachment interior, said attachment interior comprising a conduit, and
   2. a first opening and a second opening, said first and second openings being physically continuous with said conduit, said first opening and said second opening being circular in cross section and oblong in cross section respectively, and
   3. six contiguous rectangular faces, two said rectangular faces opposing each other, one opposing first said face containing said first opening and one opposing second said face comprising said second opening, and B. A protrusion protruding from said three-dimensional component, said protrusion forming an aperture, said aperture being physically continuous with said attachment interior conduit, said protrusion reversibly connecting said food compressing attachment to said pressure generating device.

4. A food compressing attachment, said food compressing attachment being cleaned manually or within a dishwasher, said food compressing attachment comprising A. a single three dimensional component, said three dimensional component further comprising contiguous rectangular faces;

B. An interior, said interior comprising a conduit, said conduit comprising a first chamber and a second chamber, C. A rectangular slot and an oblong opening, said rectangular slot and said oblong opening opposing each other, said rectangular slot and said oblong being physically continuous with said conduit; and D. A component that retrofits and reversibly attaches to one of a group consisting of a plurality of pressure generating devices, said component further simultaneously attaching to said food compression attachment.

* * * * *